(12) United States Patent
Osaki et al.

(10) Patent No.: US 6,594,886 B2
(45) Date of Patent: Jul. 22, 2003

(54) METHOD OF FUSE MANUFACTURE AND A BATTERY PACK CONTAINING THAT FUSE

(75) Inventors: Kazuo Osaki, Mihara-gun (JP); Hisashi Hashimoto, Sumoto (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 236 days.

(21) Appl. No.: 09/834,650

(22) Filed: Apr. 16, 2001

(65) Prior Publication Data

US 2001/0046615 A1 Nov. 29, 2001

(30) Foreign Application Priority Data

Apr. 17, 2000 (JP) ......................... 2000-115753

(51) Int. Cl.[7] ...................... H01H 69/02; H01M 14/00; H01M 14/48; H01M 2/10; H01M 10/50
(52) U.S. Cl. ................. 29/623; 429/7; 429/8; 429/93; 429/99; 429/120
(58) Field of Search ................ 29/623; 429/7, 429/8, 93, 99, 120

(56) References Cited

FOREIGN PATENT DOCUMENTS

| JP | 55-141448 | 10/1980 |
| JP | 11-154714 | 11/2000 |

*Primary Examiner*—Patrick Ryan
*Assistant Examiner*—Thomas H. Parsons
(74) *Attorney, Agent, or Firm*—Wenderoth, Lind & Ponack, L.L.P.

(57) ABSTRACT

The method of fuse manufacture has a step to fabricate a metal plate with an overall long narrow shape, with a plurality of rows of connecting pieces having separated tips and connected aft ends, and with the tip of each connecting piece arranged in a straight line; a step to connect the tips of adjacent connecting pieces by welding wire to the connecting piece tip regions which are arranged in a straight line; a step to treat two adjacent connecting pieces as a unit, to cut the wire between each two-connecting piece unit for separation, and to detach each individual connecting piece; and a step to bend the wire, connecting each cut two-connecting piece unit, to form the pair of connecting pieces into a straight line.

16 Claims, 5 Drawing Sheets

METHOD OF FUSE MANUFACTURE AND A BATTERY PACK CONTAINING THAT FUSE

This application is based on application No. 115753 filed in Japan on Apr. 17, 2000, the content of which incorporated hereinto by reference.

BACKGROUND OF THE INVENTION

This invention relates to a method of manufacturing a fuse which melts and breaks due to heating with excessive current flow, and to a battery pack which contains that fuse.

A fuse shuts off current flow by melting open due to heat generated by excessive current flow. A fuse is heated by Joule heating. Joule heating increases in proportion to the square of the current times the electrical resistance of the fuse. Consequently, as current flow increases, Joule heating increases abruptly heating the fuse to high temperatures. The temperature at which a fuse blows is determined by the metal used. Thus, a fuse heats and melts open at a prescribed current flow and shuts off that current.

A battery pack contains a fuse to protect the batteries from excessive currents. A fuse is connected in series with the batteries and is melted open by excessive current. A battery pack which utilizes a lead In the dual role as a fuse has also been developed (Japanese Patent Application SHO 55-141448, 1980). The battery pack cited has a lead formed with a narrow section to melt open with excessive current.

In addition, the present inventor developed a fuse using laminates, such as bi-metal and tri-metal laminates of metals with different thermal expansion rates, to improve the breaking characteristics of a fuse with the previously cited structure (Japanese Patent Application HEI 11-154714, 1999). When this fuse is heated by excessive current, mechanical deformation stress, due to differences in thermal expansion rates of the laminated metals, acts on the section which blows. Consequently, this fuse has the characteristic of blowing quickly as a result of mechanical deformation stress acting on the fuse when heated by excessive current.

However, a fuse of this structure has the drawback of high materials cost because of the use of bi-metals or tri-metals. Further, in a fuse of this type with the structure shown in FIG. 1, the current at which the fuse blows is determined by the cross sectional area of a narrow section. Therefore, it is necessary to cut this section significantly thin. This is because the shut down current for a battery pack is small at only a few amperes.

A fuse made with a narrowly cut section has the drawback that it can be easily broken by mechanical shock, for example by dropping during battery pack assembly or after being assembled in a battery pack. If the fuse mechanically breaks, the battery pack becomes completely useless after that. Consequently, although it is important for a fuse installed in a battery pack to reliably melt open with excessive current flow, it is also important for the fuse not to break open as a result of mechanical shock.

Further, for a fuse with a locally narrow section as shown in FIG. 1, there are limitations to the width of the narrow region imposed by manufacturing practicality. For example, it is extremely difficult to fabricate this type of fuse for a fuse blowing current on the order of 3A. Therefore, this type of fuse has the drawback that it cannot be installed in a low capacity battery pack. Since the width of the narrow section must be made still narrower as the fuse blowing current becomes smaller, this type of low current fuse has the further drawback that it becomes easier to break by mechanical shock.

The present invention was developed to resolve these types of drawbacks. Thus it is a primary object of the present invention to provide a method of fuse manufacture and a battery pack containing that fuse wherein the fuse can be inexpensively manufactured in quantity, is blown reliably with excessive current, is difficult to break with mechanical shock, and in particular, can be made resistant to mechanical shock for low fuse blowing currents.

The above and further objects and features of the invention will more fully be apparent from the following detailed description with accompanying drawings.

SUMMARY OF THE INVENTION

The present invention manufactures a fuse by a step to fabricate a metal plate with an overall long narrow shape, with a plurality of connecting pieces having separated tips and connected aft ends, and with the tip of each connecting piece arranged in a straight line; a step to connect the tips of adjacent connecting pieces by welding wire to the connecting piece tip regions which are arranged in a straight line; a step to cut the wire between each pair of two adjacent connecting pieces and to detach each individual connecting piece; and a step to bend the wire connecting each cut pair of connecting pieces, attached at both sides of the wire, in a direction which separates both ends of the connecting pieces.

The method above can inexpensively manufacture fuses in quantity, can produce a fuse that blows reliably with excessive current but is difficult to break with mechanical shock, and in particular, the method has the characteristic that a fuse can be made to blow at low currents and be strong with respect to mechanical shock. This is because the method of manufacture above has a step to fabricate a metal plate with a plurality of connecting pieces having separated tips and connected aft ends, a step to connect the tips of adjacent connecting pieces by welding wire to the connecting piece tip regions, a step to cut the wire between each pair of two adjacent connecting pieces and to detach each individual connecting piece, and a step to bend the wire connecting each cut pair of connecting pieces in a direction which separates both ends of the connecting pieces.

Further, the method above can manufacture with extreme simplicity a fuse structure having connecting pieces at both ends of a wire, and moreover can efficiently manufacture these fuses in quantity. Consequently, fuse manufacturing cost can be reduced, and they can be inexpensively manufactured in quantity.

Further, since a fuse manufactured by the method above is configured with wire as the narrow melting and breaking region, it is stronger with respect to mechanical shock than a fuse of the type shown in FIG. 1. This is because the metal wire material itself is strong, and in addition the wire can resiliently deform. Further, since the wire is bent, this bent region can absorb and dissipate mechanical shock. In particular, since a folded back configuration for connecting piece tips allows both ends of the wire to be swaged in the folded back tips and welded to the connecting pieces, these attachment points have significant strength and their separation is difficult. Additionally, a fuse with metal wire as the narrow fusing element has a uniform cross sectional area. Since the cross sectional area of a given metal wire determines its resistance, the characteristic of reliable fuse blowing at the specified current, particularly for small currents, is achieved.

Preferably, in the method described above, the wire is bent to align the pair of connecting pieces in a straight or nearly straight line.

Connecting pieces, which connect to the fuse wire, preferably have additional processing to provide a fold back at their tips. Wire is inserted in a folded back tip, pressure is applied to swage the wire in the folded back tip, and the swaged wire is welded. A connecting piece of this structure can form a strong and reliable connection with wire via the folded back tip. Additionally, It is preferable to use SUS-304 stainless steel wire as the fuse wire, Still further, the metal plate of the present invention can be formed as a long narrow band and wire can be welded to connecting piece tip regions as metal plate is continuously supplied. For example, this method of manufacture can continuously produce fuses via an automated manufacturing line. Therefore, manufacturing efficiency can be improved and low cost production in quantity is possible.

The battery pack of the present invention is provided with a plurality interconnected rechargeable batteries disposed in parallel positions, and a fuse connected at both ends to a rechargeable battery electrode to form a series connection with the rechargeable batteries. The fuse is provided with a metal wire which melts open with a prescribed current flow, and a pair of connecting pieces which connect to both ends of the wire and are welded to battery electrodes. The tip region of a connecting piece is bent to provide a folded back tip, and wire is welded to the connecting piece while inserted in this folded back tip. Furthermore, wire welded at the folded back tips is bent in a direction which separates both ends of the connecting pieces attached to both ends of the wire, and the pair of connecting pieces is joined to battery electrodes.

A battery pack structured as described above uses a fuse with a low blow-out current which is also strong with respect to mechanical shock. Therefore, the fuse can reliably blow when excessive current flows, but it will not break due to mechanical shock making high reliability and quality possible.

DETAILED DESCRIPTION OF THE INVENTION

FIGS. 2 through 9 show the fuse manufacturing process steps. A fuse is produced by the manufacturing process steps shown in these figures and described in the following.

[Process Step to Fabricate a Metal Plate]

Figure 1:
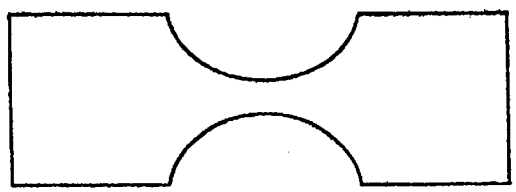
FIG. 1 is a front view showing an example of a prior art fuse.
Figure 2:
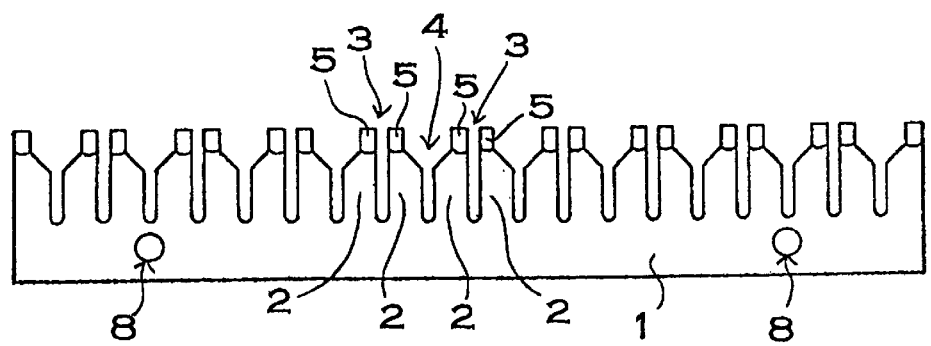
FIG. 2 is a front view showing a processed metal plate in one manufacturing step of a fuse in an embodiment of the present invention.

Metal sheet is cut and worked into the shape shown in FIG. 2 to produce a metal plate 1. The metal plate 1 of FIG. 2 is formed in an overall long narrow shape, the tips of a plurality of rows of connecting pieces 2 are separated, and the aft ends of the connecting pieces 2 are joined. Further, the tips of all the connecting pieces 2 are arranged in a straight line. A metal plate 1 of this shape is made by cutting a long narrow band of sheet metal. The metal plate 1 is made from nickel sheet. However, sheets of metal such as iron, copper, or aluminum, or sheets of metal alloys such as brass or steel may also be used for the metal plate 1. The surfaces of sheet metals which corrode are plated with nickel or chrome.

The metal plate 1 of the figures is shaped to provide alternating narrow slits 3 and wide slits 4 between connecting pieces 2. The narrow slits 3 have the same narrow width along the entire slit. The wide slits 4 gradually become wider towards the tips of the connecting pieces 2. The narrow silts 3 are the minimum width that allows metal wire 6 cutting. The wide slits 4 are spanned by metal wire 6 joining adjacent connecting pieces 2. Consequently, the width of the wide slits 4 is the length of the metal wire 6 for a fuse.

Figure 3:
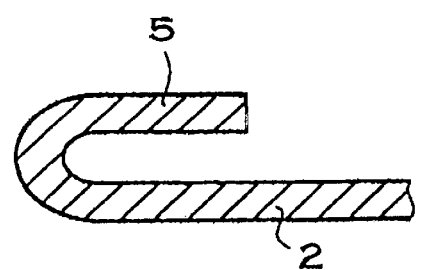
FIG. 3 is an enlarged cross-section view showing the folded back tip of a connecting piece of the metal plate shown in FIG. 2.

Additionally, as shown in the enlarged cross-section view of FIG. 3, connecting piece 2 tip regions of the metal plate 1 are bent by further processing to provide folded back tips 5. The folded back tips 5 are formed by further processing to bend the metal sheet after cutting. This is because the folded back tips 5 would be crushed by a preceding die cut process step. However, in a method of manufacture which laser cuts metal sheet to make the metal plate, folded back tips can be provided by laser cutting after bending one edge of the metal sheet.

[Process Step to Weld on Wire]

Figure 4:
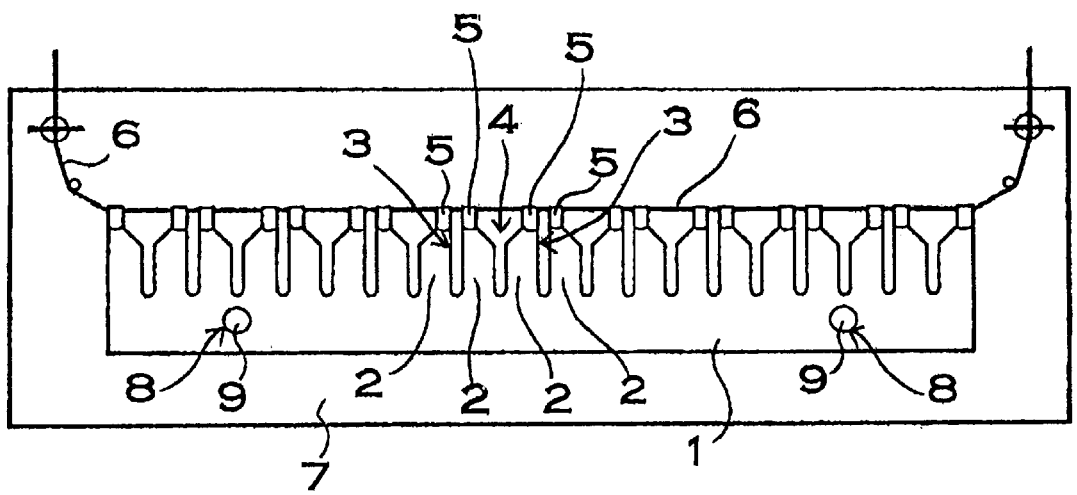
FIG. 4 is a front view showing metal wire set in position on the metal plate shown in FIG. 2.
Figure 5:
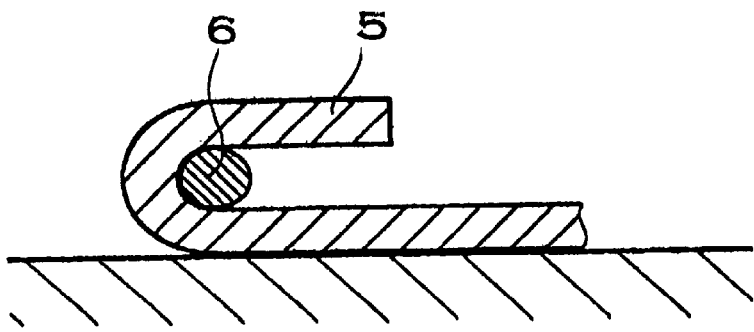
FIG. 5 is an enlarged cross-section view showing the tip region of a connecting piece of the metal plate shown in FIG. 4.

As shown in FIG. 4, the metal plate 1 is placed in a fixed position on a metal mount 7, and metal wire 6 is set in the straight line arrangement of connecting piece 2 tip regions. The metal plate 1 shown in FIG. 4 is provided with two through holes 8, and alignment pins 9 on the metal mount 7 fit in these through holes 8 to locate the metal plate 1 in a fixed position on the metal mount 7. As shown in the enlarged cross-section view of FIG. 5, wire 6 is hooked into a fixed position in each folded back tip provided at the end of each connecting piece 2. Further, to pull the wire 6 into a straight line, both ends of the wire are pulled and temporarily fixed to the metal mount 7 with a prescribed amount of tension. Stainless steel wire is suitable metal wire 6. Specifically, SUS-304 stainless steel wire is optimal. This is because SUS-304 is thin and strong as well as having large electrical resistance for reliable melting at high currents. However, other wire materials besides stainless steel, such as aluminum or nickel, may also be used.

Figure 6:
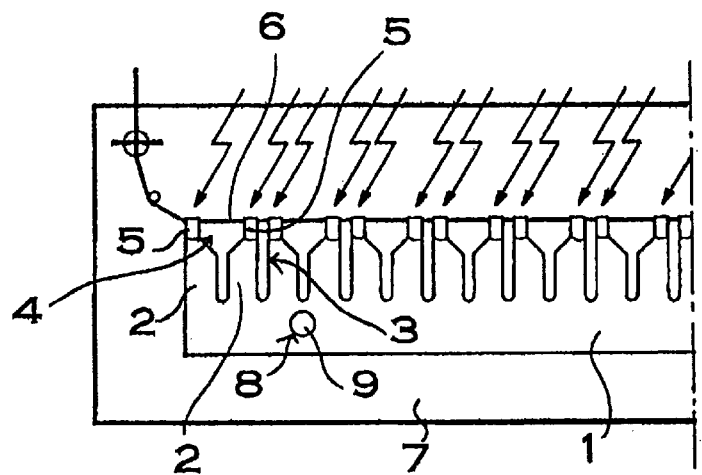
FIG. 6 is a front view showing the process step for spot welding tip regions of the connecting pieces of the metal plate shown in FIG. 4.
Figure 7:
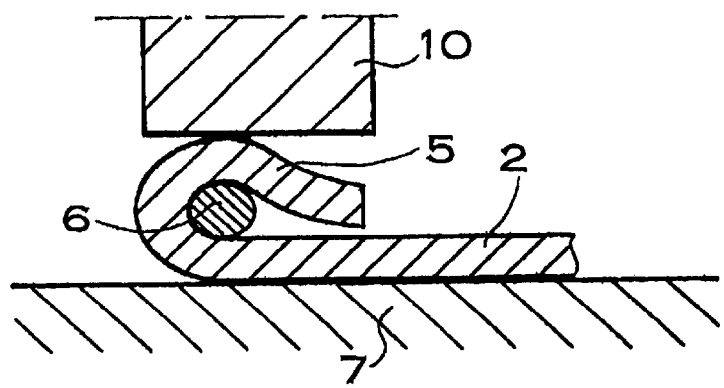
FIG. 7 is an enlarged cross-section view showing the connecting piece tip region shown in FIG. 5 at spot welding.

Subsequently, as shown in FIG. 6, tip regions of connecting pieces 2 are spot welded to the wire 6 to connect adjacent connecting piece 2 tip regions with wire 6. As shown in FIG. 7, a welding electrode 10 is pressed onto a folded back tip 5 with wire 6 inserted, high current is applied, and both surfaces of the wire 6 are spot welded to the metal plate 1. During spot welding, the metal mount 7 is used as the other electrode. Consequently, a low resistance metal such as copper is used for the metal mount 7.

[Cutting Process Step]

Figure 8:
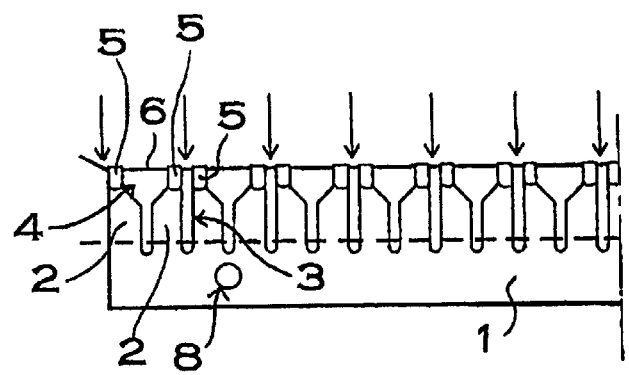
FIG. 8 is a front view showing the process step to cut the metal plate shown in FIG. 6.

As shown in FIG. 8, two adjacent connecting pieces 2 are treated as a unit, wire 6 is cut between each two-connecting piece 2 unit for separation, and each individual connecting piece 2 is also cut and separated. Wire 6 is cut at the narrow slits 3 as shown by the arrows in FIG. 8. Further, the metal plate 1 is cut, using a tool such as shears, at the narrow silt 3 and wide slit 4 locations along the broken line shown in FIG. 8, to detach and separate all connecting pieces 2.

[Process Step to Bend the Wire]

Figure 9:
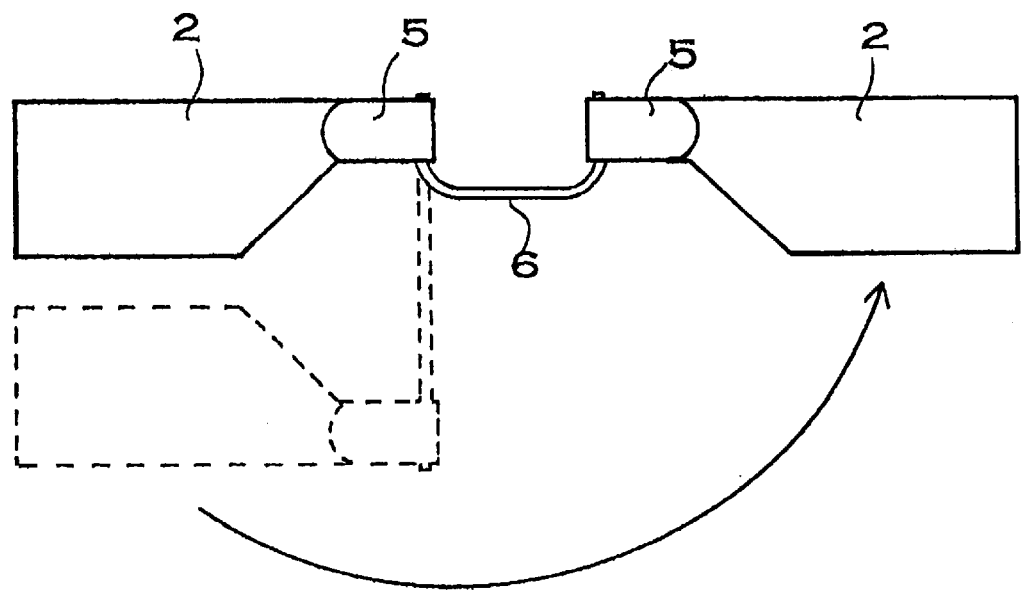
FIG. 9 is a front view showing the cut connecting pieces bent at the wire into a straight line.

Next, as shown in FIG. 9, metal wire 6, connecting a cut-out two-connecting piece 2 unit, is bent in a direction to separate both aft ends of the pair of connecting pieces 2 attached at both ends of the wire 6. In the fuse shown in FIG. 9, the wire 6 is bent until the pair of connecting pieces 2 are positioned in a straight line. However, the wire 6 may also be bent to put the pair of connecting pieces in a somewhat inclined position and not bent until they form a straight line. For example, the wire 6 may be bent to form an angle of 90° to 180° between the lengthwise axes of the connecting pieces. The wire 6 shown in FIG. 9 is bent with a small radius of curvature at the tip of each connecting piece 2. However, It is also possible to bend the wire with a u-shaped bend at its center.

Figure 10:
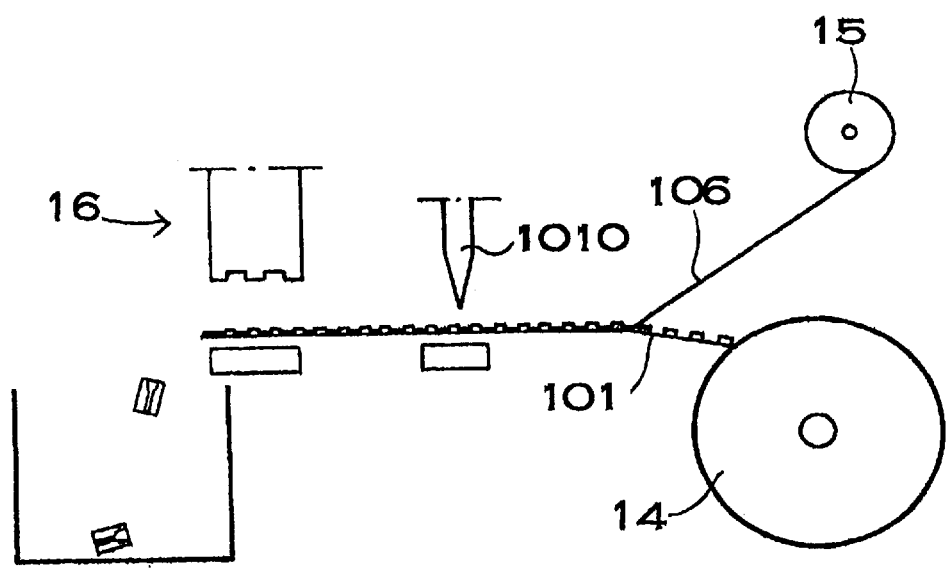
FIG. 10 is an abbreviated diagram showing another embodiment of the method of fuse manufacture of the present invention.

As shown in FIG. 10, the method of fuse manufacture of the present invention may also produce fuses in a continuous fashion via an automated manufacturing line. The manufacturing line shown in FIG. 10 continuously supplies metal plate 101 formed in a long narrow band from a drum 14, welds metal wire 106 to the tips of connecting pieces, and cuts the metal plate 101 at prescribed locations to produce fuses.

The drum 14 in FIG. 10 is wound with a long narrow band of metal plate 101, which is formed from a further processed long narrow band of sheet metal. A long band of metal plate 101 is formed, as shown in FIG. 2, by further working a band of sheet metal. Namely, a plurality of connecting pieces are formed with separated tips and connected aft ends, and folded back tips are provided by bending the tip of each connecting piece. The manufacturing line of FIG. 10 supplies this band of metal plate 101 to the next process step from a drum 14. However, the manufacturing line may also provide automated process steps to form a plurality of connecting pieces and folded back tips on a band of sheet metal to make a band of metal plate. This manufacturing line continuously supplies a band of sheet metal with no connecting piece or folded back tip processing, performs process steps to form a plurality of connecting pieces and folded back tips, and supplies the band to the next process step.

Metal wire 106 is supplied from a coil of wire 15 and joined to metal plate 101 supplied from a drum 14 in a continuous fashion. The wire coil 15 is a coil wound with metal wire 106 which supplies wire 106 in a continuous fashion, The wire 106 hooks into folded back tips provided at the ends of the plurality of connecting pieces to set the wire 106 in fixed positions on the metal plate 101. Preferably, wire 106 is continuously supplied and set on the metal plate 101 with a prescribed amount of tension in the wire 106. Continuously supplied wire 106 set in place on continuously supplied metal plate 101 is transferred to the next process step.

The tip regions of connecting pieces are spot welded to weld the wire to the connecting pieces. A welding electrode 1010 presses down and high current is passed to spot weld both sides of the wire 106, held between a folded back tip and connecting piece, to the metal plate 101.

Wire 106 welded to the metal plate 101 is cut at prescribed locations by a cutting machine 16. As shown in FIG. 8, two adjacent connecting pieces 2 are treated as a unit, the cutting machine 16 cuts wire between each two-connecting piece 2 unit for separation, and also cuts and separates each individual connecting piece 2. Wire 6 is cut at the narrow slits 3 as shown by the arrows in FIG. 8 and connecting pieces 2 are cut and separated along the broken line shown in FIG. 8. Next, as shown in FIG. 9, wire, connecting a cut-out two-connecting piece 2 unit, is bent in a direction to separate both aft ends of the pair of connecting pieces 2 and position them in a straight line.

Figure 11:
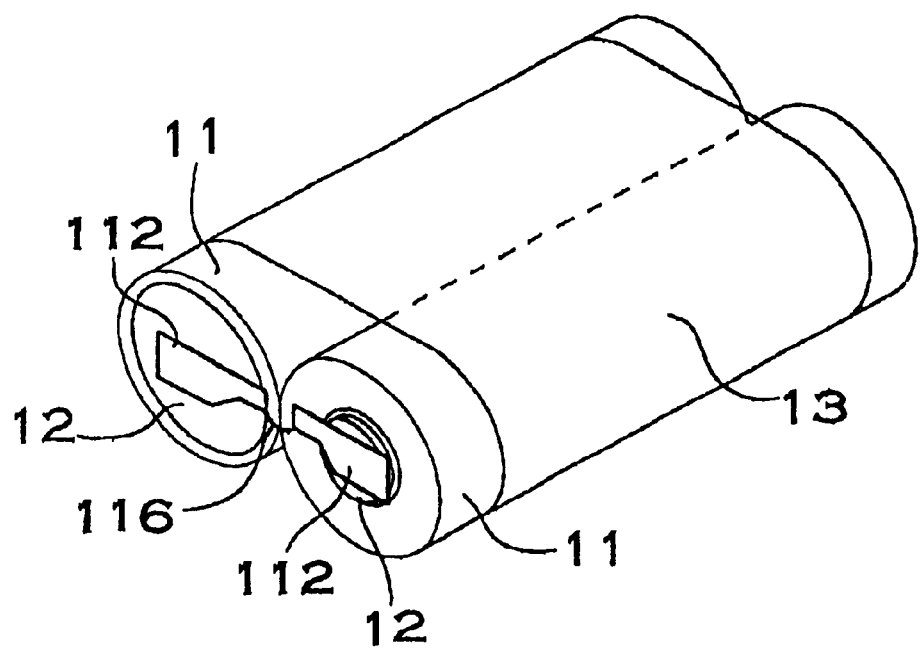
FIG. 11 is an oblique view of an embodiment of the battery pack containing a fuse of the present invention.

FIG. 11 shows a battery pack containing a fuse manufactured by the process described above. In the battery pack of FIG. 11, both ends of a fuse are spot welded to the electrodes 12 of two rechargeable batteries 11, fastened parallel to each other, to electrically connect the rechargeable batteries 11 in series. The rechargeable batteries 11 of the battery pack shown in FIG. 11 are fixed in a parallel disposition by heat-shrink tubing 13. The rechargeable batteries 11 may also be bonded or pressure fit in a case to fix their positions, The batteries 11 are arranged and connected such that their electrodes 12, which are connected by a fuse, lie in the same plane. Although the battery pack of FIG. 11 is provided with two rechargeable batteries 11, there may be three or more batteries.

A fuse has connecting pieces 112 welded to both ends of a metal wire 116. Each connecting piece 112 of the fuse in FIG. 11 is spot welded at two locations for connection to the electrodes 12. The two long narrow connecting pieces 112 are arranged in a straight line, and wire 116 is welded to their opposing tips. The wire 116, which is welded to the connecting pieces 112, is bent in a direction to separate both aft ends of the connecting pieces 112 attached at both ends of the wire 116. The metal wire 116 has both end regions oriented parallel to each other, and connecting pieces 112 are attached to both these end regions. The wire 116 shown in FIG. 11 is curved at its center region and both end regions have a parallel orientation. However, the center region of the wire may also have a straight line configuration, and both end regions may be bent at right angles and joined to the connecting pieces.

A fuse which uses SUS-304 stainless steel wire as its metal wire 116 can have a blow-out current setting of 5A for a wire diameter of 0.2 mm, and can have a blow-out current setting of 3A for a wire diameter of 0.15 mm. SUS-304 stainless steel wire has a strength applicable for use in springs, and has the characteristic that it is thin and mechanically strong.

A battery pack provided with three or more rechargeable batteries connects electrodes of two rows of batteries by a fuse, and connects other electrodes by conducting leads to join all the batteries. Nickel sheet, or nickel or chrome plated sheet metal such as iron, copper, or brass can be used as the conducting leads. In addition, all the batteries of a battery pack housing three or more batteries may be connected in series via fuses. Finally, four or more batteries may be connected in series via a plurality of fuses and leads.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A method of fuse manufacture comprising:
   fabricating a metal plate with an overall long narrow shape, with a plurality of rows of connecting pieces having separated tips and connected aft ends, and with the tip of each connecting piece arranged in a straight line;

connecting tip regions of adjacent connecting pieces by welding metal wire to the connecting piece tip regions which are arranged in a straight line;

treating two adjacent connecting pieces as a unit, to cut the wire between each two-connecting piece unit for separation, and to detach each individual connecting piece;

bending the wire connecting each cut two-connecting piece unit in a direction which separates both ends of the pair of connecting pieces attached to both sides of the wire; and further processing the connecting piece tip regions to provide folded back tips, inserting wire inside the folded back tips, and swaging and welding the wire via the folded back tips.

2. A method of fuse manufacture as recited in claim 1 wherein nickel sheet metal is used as the metal plate.

3. A method of fuse manufacture as recited in claim 1 wherein one material is selected from iron, copper, or aluminum sheet metal, or from alloy sheet metal such as brass or stainless steel, and is used as the metal plate.

4. A method of fuse manufacture as recited in claim 1 wherein the metal wire is bent until the pair of connecting pieces are positioned in a straight or nearly straight line.

5. A method of fuse manufacture as recited in claim 1 wherein narrow slits and wide slits are established in an alternating pattern in the metal plate, adjacent connecting pieces are grouped by the slits, and wire is cut in the narrow slits.

6. A method of fuse manufacture as recited in claim 5 wherein the narrow slits have uniform width overall, and the wide slits gradually become wider towards connecting piece tips.

7. A method of fuse manufacture as recited in claim 1 wherein stainless steel wire is used as the metal wire.

8. A method of fuse manufacture as recited in claim 7 wherein SUS-304 stainless steel wire is used as the metal wire.

9. A method of fuse manufacture as recited in claim 1 wherein either aluminum wire or nickel wire is selected and used as the metal wire.

10. A battery pack comprising:
(a) a plurality of interconnected rechargeable batteries fixed in parallel orientation;
(b) a fuse connected at both ends to a rechargeable battery electrode to connect the rechargeable batteries in series;

said fuse further comprising:

metal wire which melts open with a prescribed current flow;

a pair of connecting pieces attached to both ends of the wire and welded to battery electrodes;

and wherein the tip regions of connecting pieces are bent to provide folded back tips, wire is welded while being held inside these folded back tips, further, wire which is welded in the folded back tips is bent in a direction which separates both ends of the pair of connecting pieces attached to both sides of the wire, and the pair of connecting pieces is connected to battery electrodes.

11. A battery pack as recited in claim 10 wherein the metal wire is bent until the pair of connecting pieces are positioned in a straight or nearly straight line.

12. A battery pack as recited in claim 10 wherein the fuse connecting pieces are nickel sheet metal.

13. A battery pack as recited in claim 10 wherein the fuse connecting pieces are one material selected from iron, copper, or aluminum sheet metal, or from alloy sheet metal such as brass or stainless steel.

14. A battery pack as recited in claim 10 wherein the metal wire of the fuse is stainless steel wire.

15. A battery pack as recited in claim 14 wherein the metal wire of the fuse is SUS-304 stainless steel wire.

16. A battery pack as recited in claim 10 wherein the metal wire of the fuse is selected from either aluminum wire or nickel wire.

* * * * *